(12) United States Patent
Yasukura

(10) Patent No.: US 7,231,528 B1
(45) Date of Patent: Jun. 12, 2007

(54) METHOD OF EDITING/RESTORING ELECTRONIC INFORMATION

(75) Inventor: Yutaka Yasukura, 11-13-506, Hatagaya-1 chome, Shibuya-ku, Tokyo-to 151-0072 (JP)

(73) Assignee: Yutaka Yasukura, Tokyo (JP)

( * ) Notice: Subject to any disclaimer, the term of this patent is extended or adjusted under 35 U.S.C. 154(b) by 723 days.

(21) Appl. No.: 10/362,412

(22) PCT Filed: Sep. 20, 2000

(86) PCT No.: PCT/JP00/06420

§ 371 (c)(1),
(2), (4) Date: Feb. 25, 2003

(87) PCT Pub. No.: WO02/27501

PCT Pub. Date: Apr. 4, 2002

(51) Int. Cl.
G06F 11/30 (2006.01)
H04L 9/00 (2006.01)
G06F 12/14 (2006.01)
H04N 7/167 (2006.01)

(52) U.S. Cl. ............... 713/193; 713/171; 713/189; 380/216; 380/229

(58) Field of Classification Search .............. 713/193
See application file for complete search history.

(56) References Cited

U.S. PATENT DOCUMENTS 3,773,977 A * 11/1973 Guanella ............... 380/36

FOREIGN PATENT DOCUMENTS

| FR | 2486680 A1 | 1/1982 |
| JP | 04-184476 | 7/1992 |
| JP | 09-293021 | 11/1997 |
| JP | 2000-173178 | 6/2000 |
| WO | WO 00/45358 | 8/2000 |

OTHER PUBLICATIONS

C.E. Shannon "Communication Theory of Secrecy Systems" Bell System Technical Journal, American Telephone and Telegraph Co. NY, vol. 28, Oct. 1, 1949, pp. 656 and 670-679.
Basic Cryptology 1, (Masataka Kato), K.K. Science-sha, Sep. 25, 1989 pp. 230-235.

* cited by examiner

Primary Examiner—Ayaz Sheikh
Assistant Examiner—Trang Doan
(74) Attorney, Agent, or Firm—The Fleshner Group, PLLC

(57) ABSTRACT

An electronic information file is divided into a plurality of information elements, which are combined in different orders to generate two or more information blocks and to generate a primary distribution information file holding information on the method for dividing/rearranging the information elements. Like the electronic information file, the primary distribution information file is divided into key fragments and rearranged to generate key blocks and to generate a second distribution information file holding information on the method for dividing/rearranging the primary distribution information file. The information blocks, the key blocks and the secondary distribution information file are combined to generate and store or transmit two or more packages. When the electronic information is used, the primary distribution information file is restored on the basis of the secondary distribution file to restore the electronic information file on the basis of the primary distribution information file.

4 Claims, 4 Drawing Sheets

METHOD OF EDITING/RESTORING ELECTRONIC INFORMATION

This application claims priority to PCT/JP00/06420, filed Sep. 20, 2000, published on Apr. 4, 2002, Publication No. WO 02/27501 A1 in the Japanese language.

FIELD OF THE INVENTION

The present invention concerns a security method of electronic information in storage or communication of electronic information.

BACKGROUND ART

As a number of computers are connected to the communication network and composing a system, each computer has become possible to be linked with the general public through the communication channel. Therefore, it is feared that even electronic information stored in a hard disk or other computer external memory storages be accessed by unauthorized outsiders through the communication channel, then stolen or altered.

Besides, electronic information comes often to be transmitted using a communication channel, as shown in exchange of personal informations such as electronic mail, credit card number, password, distributions of application programs such as game program, business program, and of data extracted for edit from a database.

In case of using a communication environment open to the outside for such electronic information exchange, an outsider who is not the receiver may acquire and use the electronic information during communication by interception or theft act. Especially, in case of distributing charged information or transmitting information involving the privacy, it is necessary to prevent electronic information during communication from being stolen easily.

Methods for securing the confidentiality of electronic information by the encryption are executed, because it is enough that the unrelated outside cannot use the electronic information even if it is acquired during communication or storage. The encryption technology developed for such effect exists variously for the encryption methods using symmetric keys, and for the encryption methods using asymmetric keys.

However, even when these encryption technologies are used, any person who would have acquired a decryption method by deciphering the encryption or by any means can restore easily and obtain useful information, as long as the whole information is contained in the stored electronic information or the transmitted electronic information. Moreover, the information may be altered or falsified, so we should always worry if the electronic information retrieved or received maintains the genuine information or not. Especially, the conventional method is uncertain, in case of storing or transmitting an electronic information requiring a high level of concealment, such as authentication data, high level personal secret information or company secret information and so on.

There, the inventor of the invention has already disclosed by PCT/JP99/01350 a method for dividing an electronic information file into a number of information elements, combining them in different orders to generate several information blocks and sending them individually or storing them in external memory storages individually. During the generation of information blocks, division/extraction data is created which holds information concerning the size of respective information elements, the order of combination of information elements and so on, the information blocks and the division/extraction data are sent individually or stored in external memory storages individually. When the electronic information file is restored, information elements in the information blocks are cut out, rearranged and bonded in the correct order.

According to this method, information held by an individual information block is nothing but a part of the whole electronic information, and but a gathering of divided fragments, whose information value is diminished even if the information block is stolen.

Nevertheless, in case where the division/extraction data was stolen together with some information blocks and the information elements in the information block could be rearranged correctly, at least a part of information would be known correctly by the interceptor.

On the other hand, the division/extraction data describes the position of each information element in the original electronic information file. Consequently, in case where the division/extraction data and any information blocks were stolen, the interceptor could know correctly which the position is in the original electronic information file that corresponds to the information element in the stolen information blocks, therefore, the interceptor can acquire a fragment of the useful information or a clue to infer the whole picture of the original electronic information.

DISCLOSURE OF THE INVENTION

The method of editing/restoring electronic information divides an electronic information file into a number of information elements, selects an arbitrary information element from divided information elements, and combines them in a different order to generate two or more information blocks. These information blocks are composed to include all information elements, if all information blocks are integrated. On the other hand, a primary distribution information file is created which records the method for dividing into information elements and the method for forming information blocks. Furthermore, the primary distribution information file is divided similarly into a number of key fragments and redistributed to create key blocks, and a secondary distribution information file is created which records the method for dividing into key fragments and the method for forming the key block.

The key block and the secondary distribution information file are optionally attached to the information blocks to form two or more packages, to be sent individually to the receiver or stored in external memory storages. It should be appreciated that, when the package is created, it is so composed that all information blocks and key blocks will be contained if all packages are integrated. Besides, the secondary distribution information file may be divided in a style capable of restoring easily, and then contained in a part or all packages.

When the electronic information is used, the secondary distribution information file is cut out from the packages, the key blocks contained in the packages are re-divided into key fragments based on the secondary distribution information file, and rearranged and bonded in the correct order to restore the primary distribution information file. Further, the information elements are re-divided and bonded similarly from the information blocks in the packages based on the primary distribution information file.

According to the method of editing/restoring electronic information of the present invention, the information elements would not be cut out from the information blocks and the information would not be restored correctly, even when some of packages and the secondary distribution information file were stolen, because the primary distribution information file can not be restored, as far as all packages are not stolen. In addition, the thief can not restore even a part of the information from the stolen packages nor infer the whole picture of the electronic information, because they cannot know the corresponding position of the stolen information in the whole electronic information as far as the primary distribution information file is not restored.

Consequently, as the primary distribution information file is divided, it is extremely difficult to restore or infer the information even if some of packages are stolen, and the possibility of plagiarism of the information is extremely low; therefore, the information security can be secured certainly, by using the method of editing/restoring electronic information of the present invention.

It should be noted that, it is unnecessary to take care strictly the secondary distribution information file, and any special problem will not occur without division, encrypting or other processing of the secondary distribution information file, because the information block could not be restored correctly so long as the primary distribution information file be not restored, even if the secondary distribution information file was stolen.

When the method of editing/restoring electronic information of the present invention is used for on-line sale of application programs or data base, even if a person other than the rightful purchaser steals electronic information during the communication, he can not restore the data; therefore, he can not execute the program, or acquire an useful information. Consequently, as there is no motive for stealing electronic information during the communication, the benefit of a vendor would not be damaged by the theft.

Also, when it is applied to the transmission of authentication data, an extremely secure information exchange can be realized, because even a part of the date could not be restore even if the electronic information is stolen.

BEST MODE FOR CARRYING OUT THE INVENTION

The method of editing/restoring electronic information of the present invention is a method for securing the security of electronic information in storage or communication of electronic information. The method of the present invention is capable of diminishing the value that the information has and prevents the damage of theft by making difficult to restore or infer the information that can be acquired by plagiarism, even if someone steals an electronic information in the course of storage or communication.

Now, the invention shall be described in detail referring to drawings.

Figure 1:
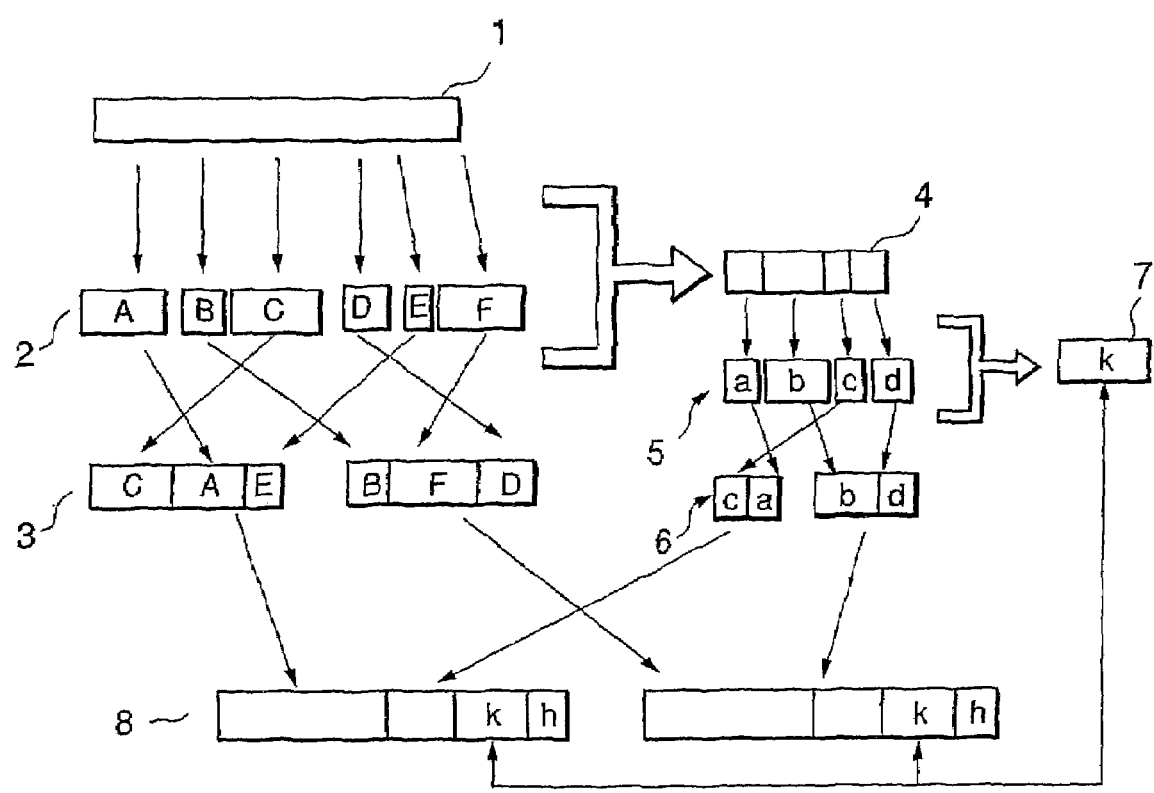
FIG. 1 is a bock diagram illustrating procedures for the transmission end in a method of editing/restoring electronic information of the present invention.
Figure 2:
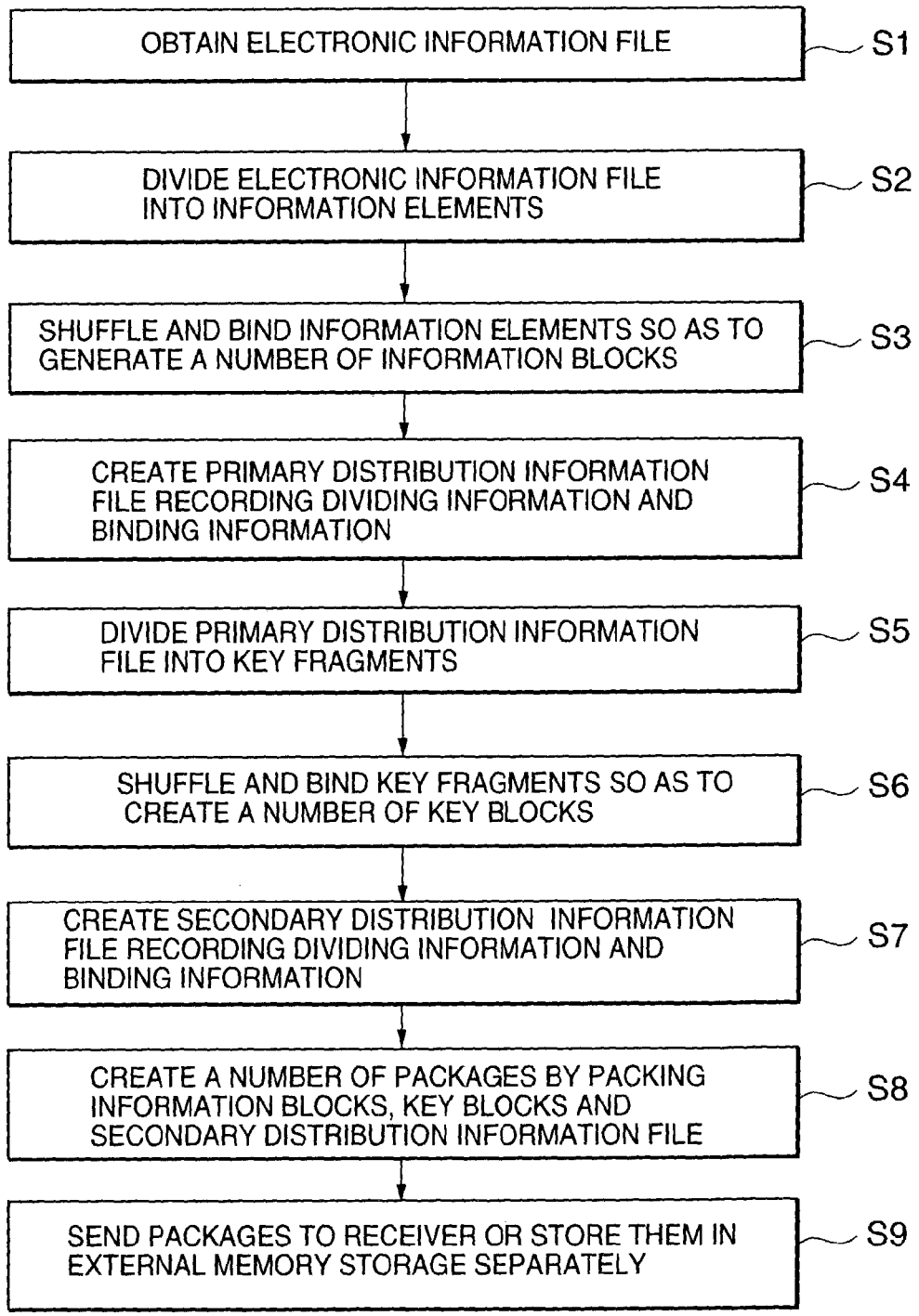
FIG. 2 is a flow diagram showing procedures for the transmission end in a method of security confirmation of the present invention.

FIG. 1 is a bock diagram illustrating a method for editing electronic information in a method of editing/restoring electronic information of the present invention. Besides, FIG. 2 is a flow diagram showing procedures for editing electronic information of the present invention. For the convenience of description, a case is illustrated where an electronic information file is divided into six information elements and allotted to two information blocks.

In the method for editing electronic information of the present invention, an object electronic information file 1 is taken in (s1) and divided into an appropriate number of information elements 2 (s2). Here, for simplicity, it is divided into six information elements A, B, C, D, E, and F. The information elements 2 are not necessary to be divided at such positions so as to have meaning information, but those obtained simply by dividing physically the electronic information file 1 are preferable, in order to reduce the danger in the case where they are plagiarized.

The order of arrangement of divided information elements A, B, C, D, E and F is changed to form an appropriate number, two in this case, of information blocks 3 by grouping conveniently (s3).

In the illustrated example, information elements A, C, E are distributed to the first information block 3 and information elements B, D, F are distributed to the second information block 3. The number of information elements in the information block 3 and the order of arrangement thereof also can be selected arbitrarily.

At the same time as the formation of the information block 3, a primary distribution information file 4 is created which records the length information of respective information elements 2, the order of integration into the information block 3 and so on (s4).

The primary distribution information file 4 is divided into key fragments 5 by an operation similar to the electronic information file 1 (s5), and distributed to key blocks 6 (s6). In this example, it is divided into four key fragments, and distributed to two key blocks (c, a), (b, d). However, the number of division of key fragment or the order of distribution to key blocks also can be selected arbitrarily. It is preferred to form the same number of key blocks as information blocks 3.

Further, a secondary distribution information file 7 is created which records the length information of key fragments 5, the order of integration into the key blocks 6 and so on (s7). The secondary distribution information file 7 is indicated by a symbol k in the drawing.

Thus created information blocks 3, key blocks 6 and secondary distribution information file 7 are combined arbitrarily to form two or more packages 8 (s8) and sent individually to the receiver or store in external memory storages (s9). For the security, it is preferable to send each package via different communication channel, or to store in another storage device.

For instance, one of packages 8 holds the information elements C, A, E, the key fragments b, d and the secondary distribution information file k, the other of packages 8 holds the information elements B, F, D, the key fragments-c, a and the secondary distribution information file k. Also, each package 8 is accompanied by a header h identifying the structure of contained information.

For the packages 8 having such composition, for example in case of the second package, the information held by the respective information elements B, F, D are nothing but a tiny part of the original electronic information file 1 and, moreover, even when a part of the primary distribution information file 4 is restored using the key fragments c, a based on the secondary distribution information file k, it is impossible to infer the dividing positions of the information elements B, F, D in the information block 3, the relation between respective one of information elements B, F, D, the positions in the electronic information file 1 which located by the information held in the individual information elements and so on.

Information that can be obtained from a single package 8 becomes extremely small because the restoration of the original electronic information is made almost impossible; by dividing and extracting not only the original electronic information, but also the distribution information of electronic information in this way.

Figure 3:
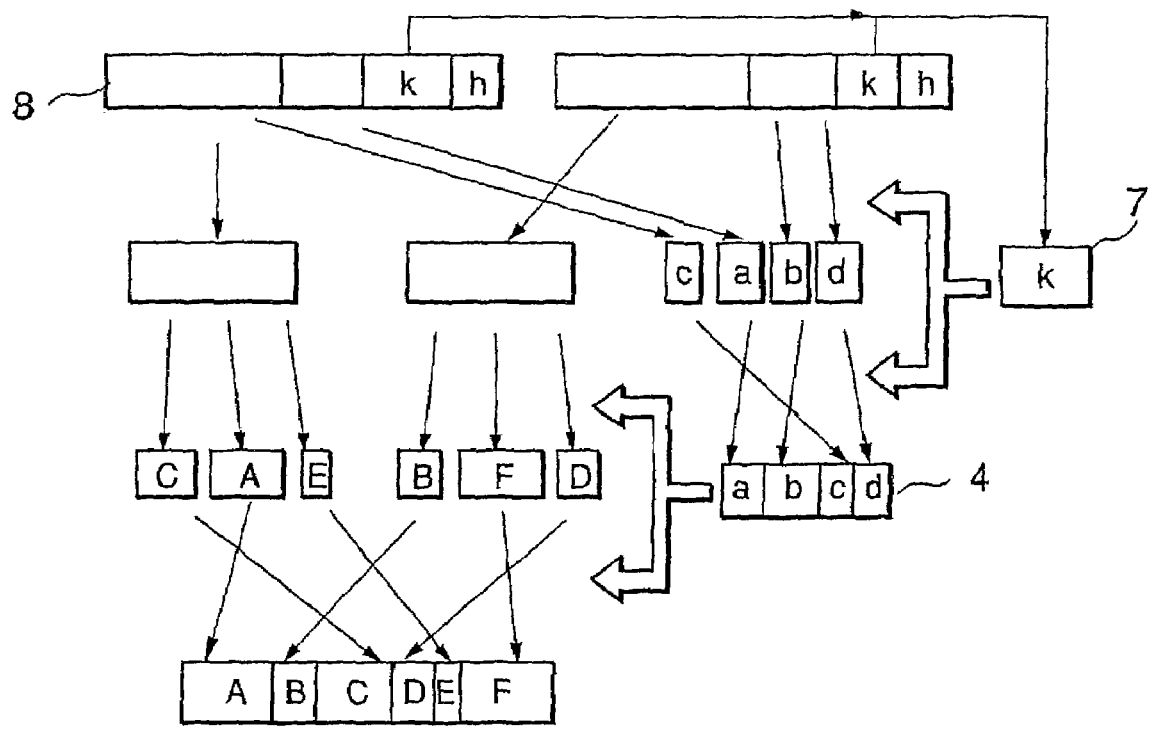
FIG. 3 is a bock diagram illustrating procedures for the receiving end in a method of editing/restoring electronic information of the present invention.
Figure 4:
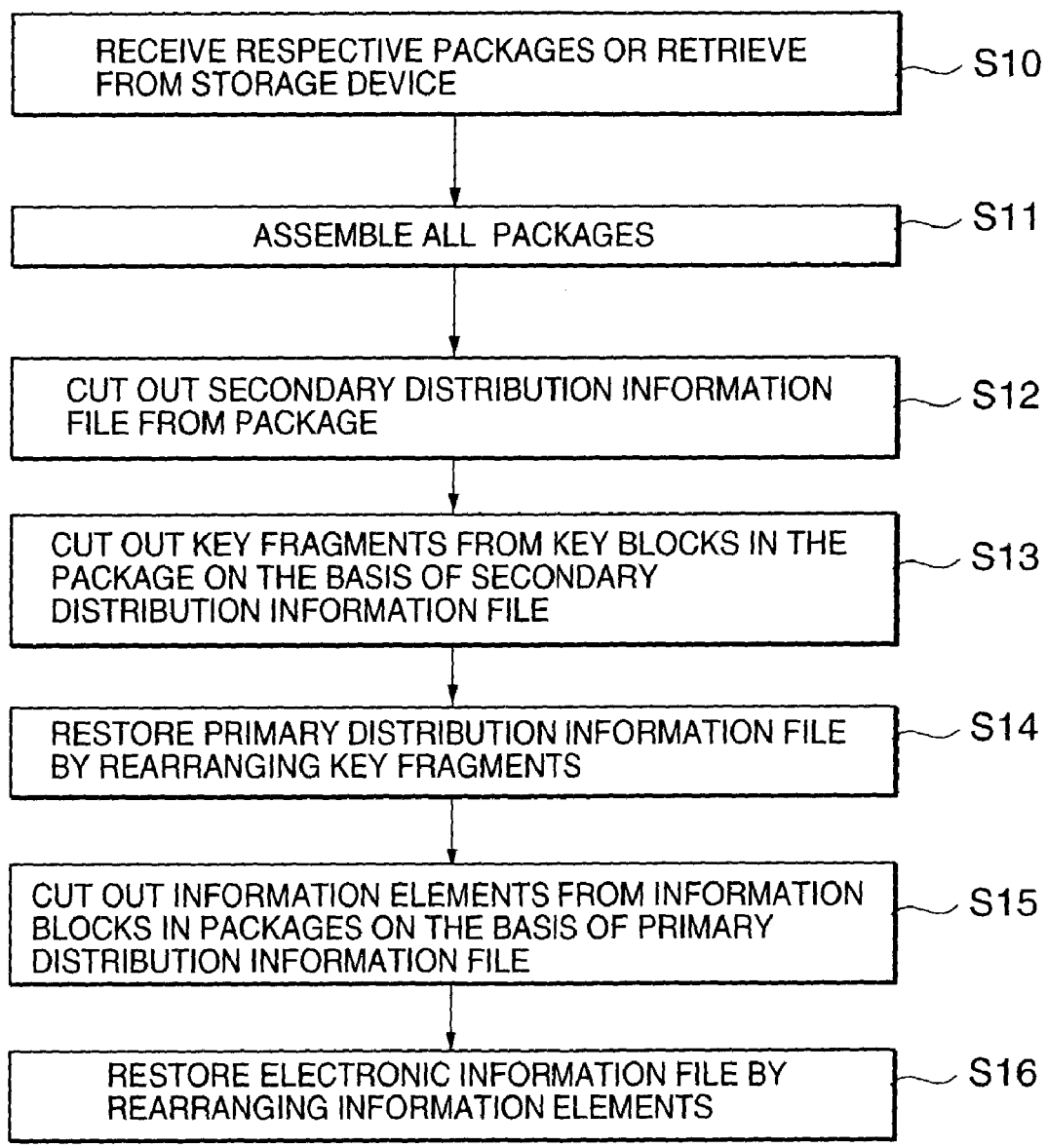
FIG. 4 is a flow diagram showing procedures for the receiving end in a method of security confirmation of the present invention.

In general, information is stolen often during transmission or storage; however, in the method of editing electronic information of the present invention, the electronic information is transmitted or stored in a state of package 8; consequently, the value of information is diminished considerably even if it is stolen by an outsider, weakening the motive for plagiarizing information and lowering the danger of plagiarism FIG. 3 is a bock diagram illustrating a method of restoring electronic information of the present invention. And, FIG. 4 is a flow diagram showing procedures for restoring electronic information of the present invention.

The user of electronic information acquires each packages 8 from the storage destination or receives them from the sender (s10), gathers all of packages 8 (s11), and cuts out first the secondary distribution information file 7 referring to the header of the packages 8 (s12). The secondary distribution information file 7 stores information concerning the order of integration of key fragments 5 into the key blocks 6, the length information and so on, therefore, the key fragments 5 are cut out from the key block 6 portion of the package 8 (s13), and rearranged to restore the primary distribution information file 4 (s14).

As the primary distribution information file 4 stores information such as the order of integration of information elements 2 into the information block 3, length of respective information elements 2 and so on, the information elements 2 are cut out based thereon (s15), rearranged to restore the original electronic information file 1, and then the original electronic information is restored (s16).

As mentioned hereinabove, in the method of editing/restoring electronic information of the present invention, the information can be sent and stored securely, because the information that can be obtained from the package is extremely small, even when the package 8 is stolen during communications or storage.

It goes without saying that the secondary distribution information file k may be contained in any of packages. Also, the secondary distribution information file k may be stored or sent separately from the packages 8.

In the method of editing/restoring electronic information of the present invention, the number of information blocks 3 corresponding to a single electronic information file 1 is not limited to two, but it may be three or more. Similarly, the number of key blocks 6 or packages 8 is not limited to two. Also, it is unnecessary that all packages 8 contain both information blocks 3 and key blocks 6. However, from the viewpoint of security, it is preferable that all packages 8 contain a key block 6. Furthermore, the secondary distribution information file 7 may be divided by a style capable of restoring easily, then distributed and attached to a number of packages 8.

Also, a program for executing the procedures of the method of editing/restoring electronic information of the present invention by a computer may be recorded on a computer readable recording medium to use or distribute.

INDUSTRIAL APPLICABILITY

As mentioned in detail hereinabove, as the method of editing/restoring electronic information of the present invention, divides an electronic information file into information elements, rearranges and store separately in information blocks, creates a primary distribution information file holding information about this method of division and rearrangement, divides the primary distribution information file into key fragments, creates a secondary distribution information file holding information about the method of division and rearrangement of the primary distribution information file, generates two or more packages by containing conveniently information blocks together with key blocks and the secondary distribution information file, and puts in a communication channel or stores in a storage device, even when an outsider steals information blocks in the course of communication or storage, they can not decipher the contents of the electronic information, because small information elements are stored in pieces, allowing to prevent the secret from leaking.

The invention claimed is:

1. A method of editing and restoring electronic information; the method of editing comprising, dividing an electronic information file into a number of information elements, generating two or more information blocks that would contain all information elements if all information blocks are integrated by selecting divided information elements and combining in different order, and also, generating a primary distribution information file recording said method of division into said information elements and formation information of information blocks, dividing the primary distribution information file into a number of key fragments, generating two of more key blocks that would contain all key fragments if all key blocks are integrated by selecting the divided key fragments and combining in different order, generating a secondary distribution information file recording information of said key fragments and forming information of said key blocks, creating a number of packages by packaging together with said information blocks and key blocks, or together with said information blocks, the key blocks and the secondary distribution information file, and storing or transmitting the packages individually, and the method of restoring electronic information comprising, assembling the packages edited by the method of editing electronic information by receiving or reading out the packages, cutting out the secondary distribution information file from the packages, restoring the primary distribution information file by re-dividing the key fragments contained in the key blocks based on the secondary distribution information file to rearrange and integrate in a correct order, and at the same time, restoring the electronic information file by re-dividing information elements contained in the information blocks based on the primary distribution information file to rearrange and integrate in the correct order.

2. A computer readable recording medium for recording a program for executing, by a computer, of procedures of, dividing an electronic information file into a number of information elements each having an arbitrary length, generating two or more information blocks that would contain all information elements if all information blocks are integrated by selecting the divided information elements and combining in different order, generating a primary distribution information file recording formation information of the information elements and the information blocks, dividing the primary distribution information file into a number of key fragments each having an arbitrary length, generating two of more key blocks that would contain all key fragments if all key blocks are integrated by selecting divided the key fragments and combining in different order, generating a secondary distribution information file recording said forming information of key fragments and key blocks, creating a number of packages by packaging together with said information blocks and key blocks, or said information block, key blocks and the secondary distribution information file, and storing or transmitting the packages individually; and assembling the individually stored or transmitted packages by receiving or reading out them all, cutting out the secondary distribution information file from the package, restoring the primary distribution information file by re-dividing the key fragments contained in the key block based on the secondary distribution information file to rearrange and integrate in a correct order, and at the same time, restoring the electronic information file by re-dividing information elements contained in the information block based on the primary distribution information file to rearrange and integrate in a correct order.

3. The method of editing and restoring electronic information of claim 1, wherein said number of information elements each have an arbitrary length.

4. The method of editing and restoring electronic information of claim 3, wherein said number of key fragments each have an arbitrary length.

* * * * *